United States Patent [19]

Lavens

[11] 4,260,174
[45] Apr. 7, 1981

[54] HITCH APPARATUS FOR A STEERABLE TOWED VEHICLE

[76] Inventor: Charles A. Lavens, Rte. 1, 2345 E. 275 Rd., Oglesby, Ill. 61348

[21] Appl. No.: 11,449

[22] Filed: Feb. 12, 1979

Related U.S. Application Data

[63] Continuation-in-part of Ser. No. 877,027, Feb. 10, 1978, abandoned.

[51] Int. Cl.³ .................. B60D 1/02; B62D 13/04
[52] U.S. Cl. ............................... 280/444; 280/103; 280/515
[58] Field of Search ........... 280/444, 445, 103, 405 R, 280/489, 477, 508, 509, 510, 515, 504

[56] References Cited

U.S. PATENT DOCUMENTS

| 1,174,441 | 3/1916 | Pennington | 280/444 |
| 2,411,009 | 11/1946 | Slimp | 280/405 R |
| 3,876,240 | 4/1975 | Watson | 280/103 X |

FOREIGN PATENT DOCUMENTS

| 118908 | 9/1944 | Australia | 280/444 |
| 835262 | 2/1952 | Fed. Rep. of Germany | 280/489 |
| 409313 | 4/1934 | United Kingdom | 280/444 |

Primary Examiner—John A. Pekar
Attorney, Agent, or Firm—Zarley, McKee, Thomte, Voorhees & Sease

[57] ABSTRACT

A hitch apparatus for a towed vehicle having a frame and steerable front wheels includes an elongated tongue connected to the frame for pivotal movement about a horizontal axis. A coupling adapted for rigid connection to a towing vehicle is pivotally connected to the forward end of the tongue for pivotal turning movement about an upright axis. An elongated steering rod is pivotally connected at one end to the coupling and pivotally connected at the other end to a mechanism for steering the front wheels in unison in response to pivotal turning movement of the coupling. A load transfer mechanism includes spring bias means interconnecting the tongue and frame for biasing the tongue downwardly relative to the frame to transfer some of the load from the front wheels to the towing vehicle. The coupling includes a pin connection to the drawbar of a towing vehicle for fore and aft travel movement therewith and a clamp connection for securing the coupling and drawbar for pivotal steering movement in unison.

17 Claims, 14 Drawing Figures

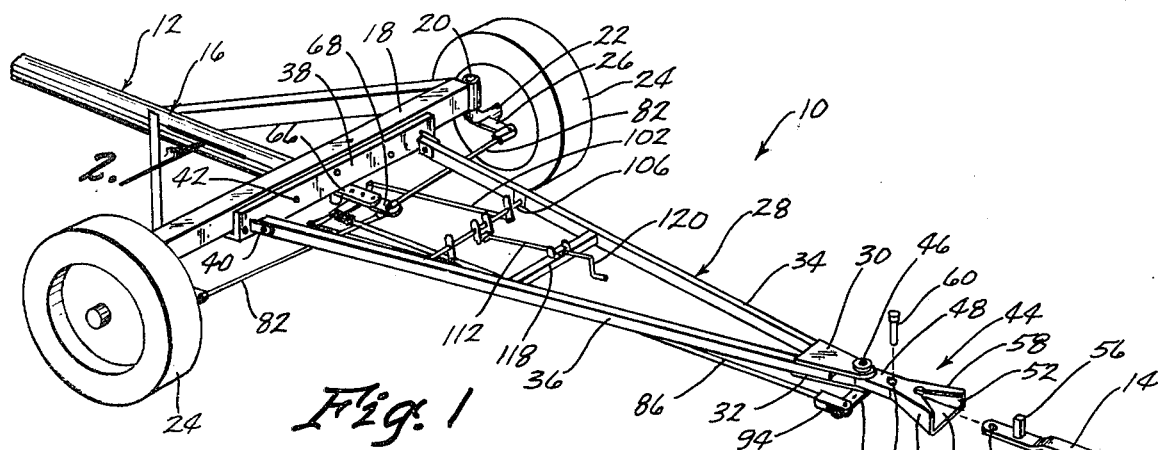
Fig. 1
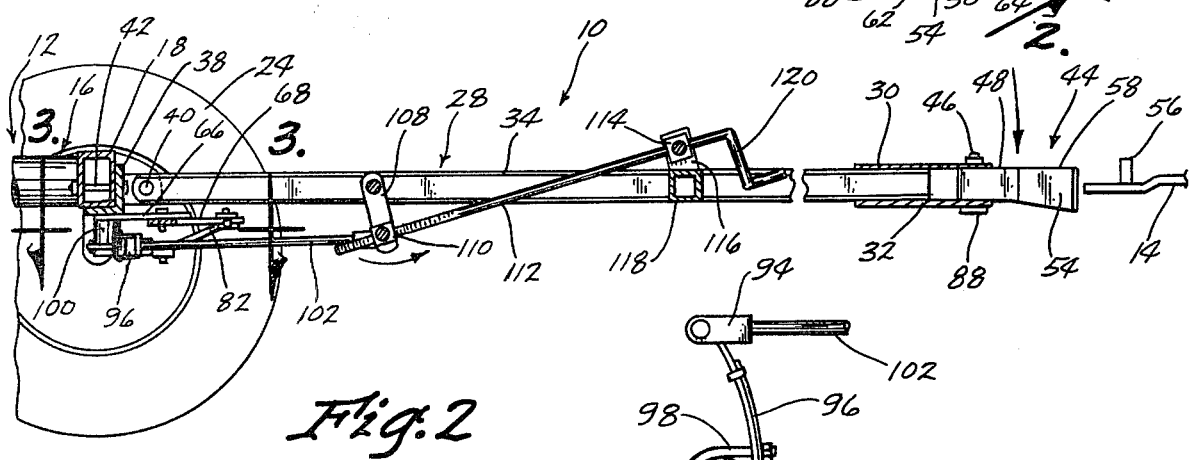
Fig. 2
Fig. 3
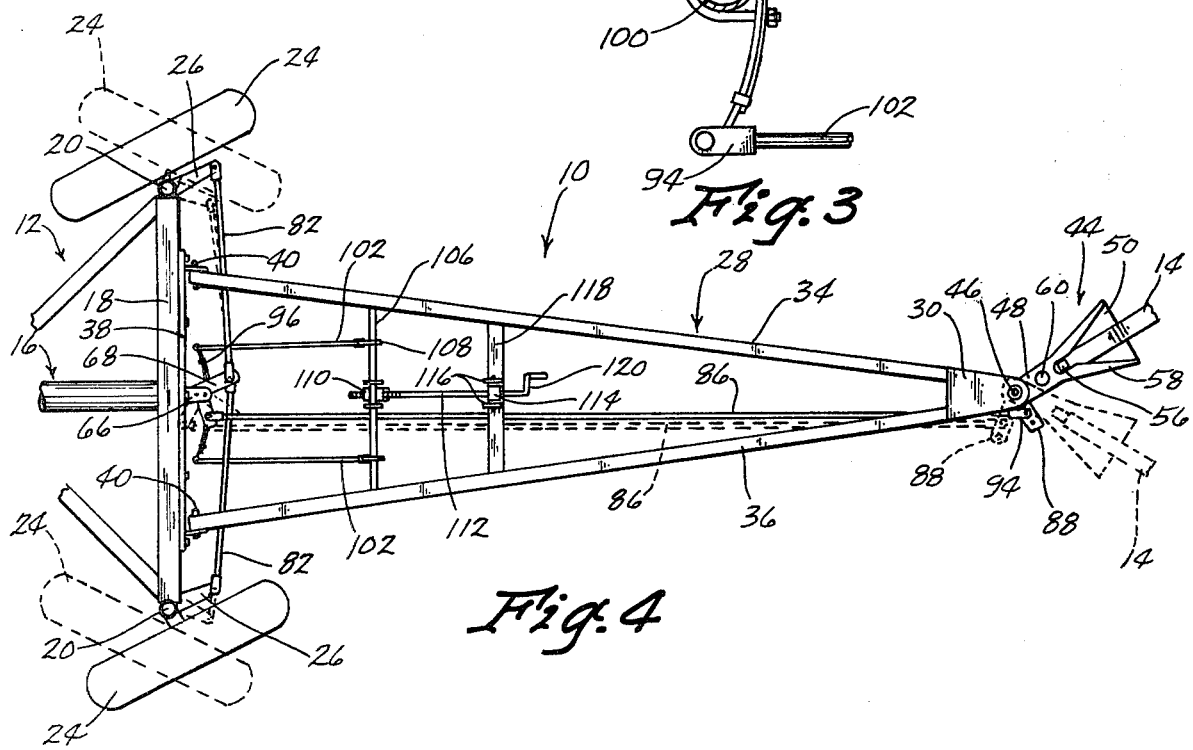
Fig. 4

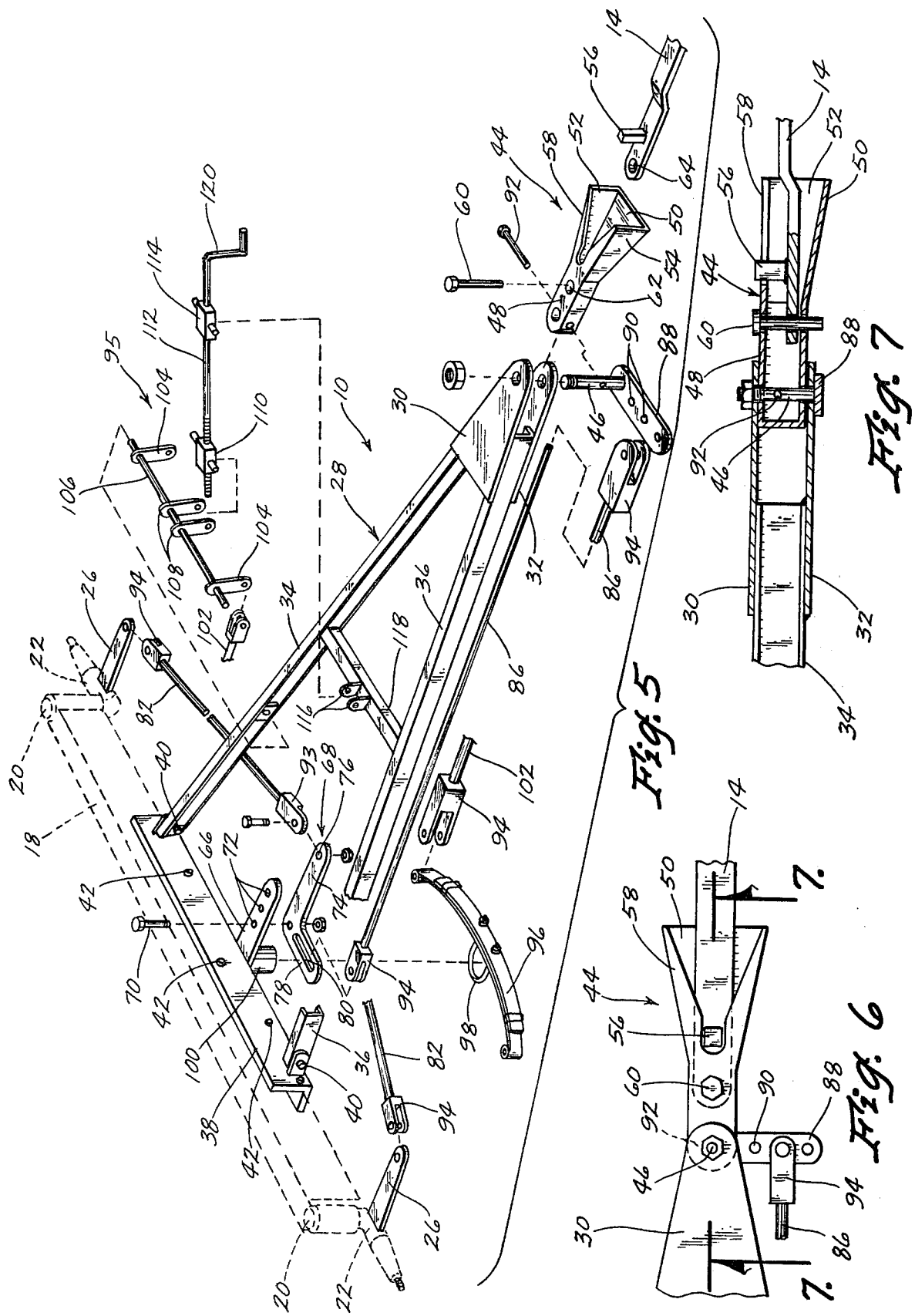

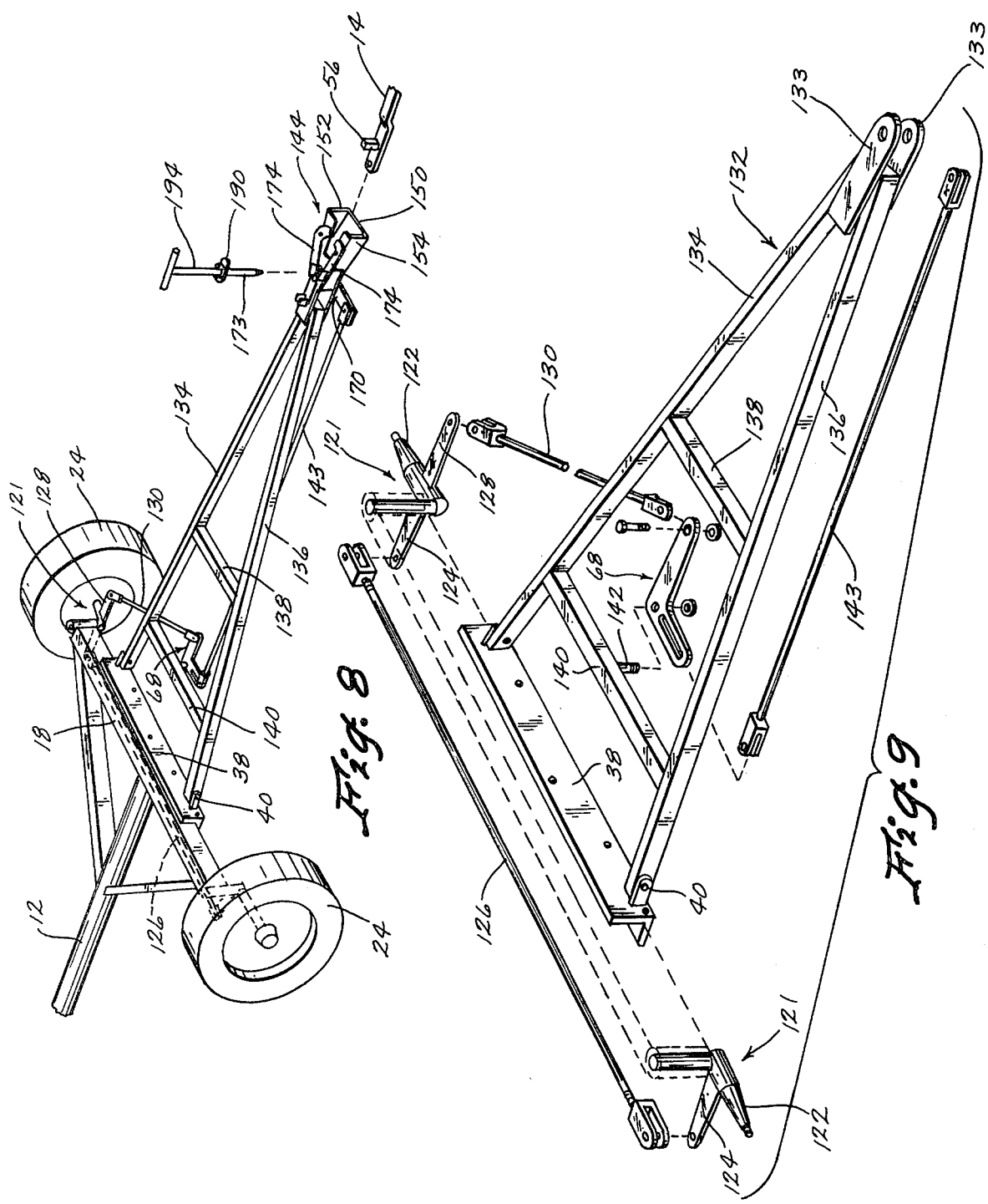

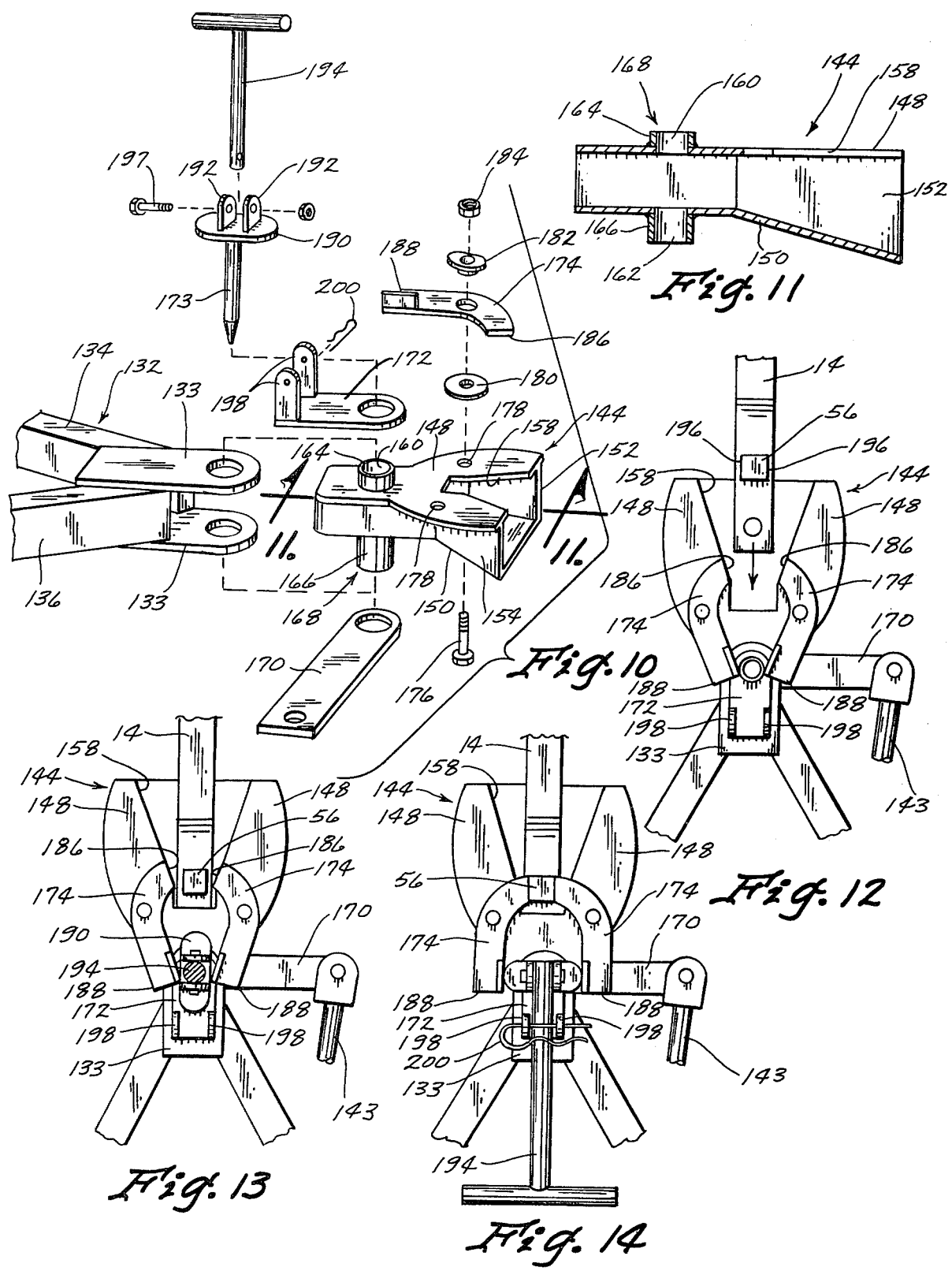

HITCH APPARATUS FOR A STEERABLE TOWED VEHICLE

CROSS REFERENCE TO RELATED APPLICATION

This is a continuation-in-part of application Ser. No. 877,027, filed Feb. 10, 1978, now abandoned.

BACKGROUND OF THE INVENTION

This invention relates generally to an apparatus for hitching a towed vehicle to a towing vehicle and more particularly to an improved hitch apparatus for a multi-axle trailer with automotive type spindle steering.

Towed vehicles in general may be classified according to whether they have a solid mounted hitch or a pivotally mounted hitch for steering front wheels of the towed vehicle. The first type would include single axle double wheel trailers such as small boat trailers and larger multi-axle vehicles wherein the axles are closely spaced such as a multi-axle mobile home or heavy-duty gravel trailer. The second type of towed vehicle includes those with spaced-apart front and rear wheels wherein the front wheels are supported for automotive type spindle steering. Most farm wagons are of this type. Such vehicles include a tongue pivotally connected to the vehicle frame and pivotally connected by tie rods to the front wheels for steering the front wheels in response to lateral pivotal movement of the tongue.

Vehicles of the second type are advantageous in that they are self-supporting independently of the towing vehicle. The disadvantage is that they are much more difficult to handle when backing up because of the double pivotal connection between the towing vehicle and towed vehicle at opposite ends of the tongue.

Another problem associated with towed vehicles of the second type is that of alleviating some of the load on the steerable front wheels of the vehicle. Heavy-duty vehicles such as large forage wagons may be provided with double rear axles for distributing the weight at the rear of the wagon onto more wheels. But because the front wheels are steerable, it would be impractical to provide double front wheels supported one behind the other.

Prior apparatus have been developed in an attempt to make a steerable towed vehicle respond like a single axle two-wheel trailer but these have had several problems associated with them. See for example Watson U.S. Pat. No. 3,876,240 wherein a two ball hitch to a towing vehicle is disclosed. This arrangement requires precise alignment between the towing vehicle and trailer or the connection cannot be made. Another problem associated with such apparatus is that up and down pivotal movement of the tongue tends to induce steering movement of the steerable trailer wheels.

SUMMARY OF THE INVENTION

The hitch apparatus of the present invention includes an elongated tongue adapted for pivotal connection to the front of a towed vehicle having front wheels supported for automotive type spindle steering. A coupling horn is pivotally connected to the front end of the tongue and is adapted for a releasable rigid connection to the towing vehicle. A steering rod is pivotally connected at one end to the coupling horn and pivotally connected at the other end to a mechanism for steering the front wheels of the towed vehicle in unison in response to pivotal turning movement of the coupling horn relative to the tongue. As a result, a towed vehicle having steerable front wheels and the hitch apparatus of the present invention responds like a single axle two-wheel trailer to make handling, especially backing up, much easier.

The coupling of the hitch apparatus is adapted to be first connected to the drawbar of a towing vehicle by a pin connection after which a clamp connection is applied to securely fix the coupling to the drawbar for pivotal steering movement in unison. As a result, the clamp connection is effective to compensate for some misalignment of the drawbar relative to the towed vehicle, thereby substantially facilitating the connection of the towed vehicle to a towing vehicle.

The tie rod actuator for the steerable wheels of the towed vehicle may be pivotally secured to the tongue adjacent the rearward end thereof so as to eliminate steering movements of the steerable wheels in response to vertical pivotal movement of the tongue.

The load transfer mechanism connected between the frame of the towed vehicle and tongue of the hitch apparatus includes spring bias means for urging the tongue to pivot downwardly relative to the frame thereby transferring some of the load off of the front steerable wheels of the towed vehicle onto the towing vehicle.

Accordingly, one object of the invention is to provide a hitch apparatus which makes a steerable towed vehicle respond like a single axle two-wheel trailer, particularly when backing up.

Another object of the invention is to provide a hitch apparatus for a steerable towed vehicle which may be easily connected to a towing vehicle.

Another object of the invention is to provide a hitch apparatus including a coupling horn connected to the front of the tongue for pivotal movement about an upright axis.

Another object of the invention is to provide a hitch apparatus including a steering mechanism for steering the front wheels of the towed vehicle in unison in response to pivotal turning movement of the coupling horn.

Another object of the invention is to provide a hitch apparatus including a steering mechanism which substantially eliminates steering movements induced by vertical pivotal movement of the hitch apparatus tongue.

Another object of the invention is to provide a hitch apparatus including a steering mechanism which is adjustable to accommodate towed vehicles of various lengths.

A further object of the invention is to provide a hitch apparatus including a load transfer mechanism for shifting some of the load off of the steerable wheels of the towed vehicle and onto the towing vehicle.

Finally, a related object of the invention is to provide a hitch apparatus with a load transfer mechanism which is adjustable for varying the load which is shifted onto the towing vehicle.

BRIEF DESCRIPTION OF THE DRAWINGS

FIG. 1 is a perspective view of the hitch apparatus of the invention shown in assembly relation with a farm wagon;

FIG. 2 is a side elevational view of the hitch apparatus taken along line 2—2 of FIG. 1;

FIG. 3 is an enlarged detail sectional view of the leaf spring of the load transfer mechanism, as seen on line 3—3 in FIG. 2;

FIG. 4 is a top plan view of the hitch apparatus showing the changed positions of the coupling horn and steering apparatus in response to turning movements of the towing vehicle;

FIG. 5 is an exploded view of the hitch apparatus of the invention;

FIG. 6 is an enlarged top detail view of the coupling horn at the front of the hitch apparatus;

FIG. 7 is a sectional view taken along line 7—7 in FIG. 6;

FIG. 8 is a perspective view of an alternate embodiment of the hitch apparatus of the invention shown in assembly relation with a farm wagon;

FIG. 9 is an exploded view of a portion of the hitch apparatus of the embodiment of FIG. 8;

FIG. 10 is an exploded view of a forward portion of the hitch apparatus of FIG. 8;

FIG. 11 is an enlarged detail sectional view taken along line 11—11 in FIG. 10;

FIG. 12 is an enlarged partial top view of the coupling arranged to receive a drawbar;

FIG. 13 is a partial top view of the coupling with a drawbar slidably received therein; and FIG. 14 is a partial top view of the coupling with a drawbar locked therein by the clamp connection.

DESCRIPTION OF THE PREFERRED EMBODIMENT

The hitch apparatus 10 of the present invention is shown in FIG. 1 in assembly relation with the chasis of a farm wagon 12 and the drawbar 14 of a towing vehicle (not shown). The farm wagon 12 includes an elongated L-frame 16 having a transverse cross member 18 at the forward end thereof. A pair of wheel spindles 20 (FIGS. 1 and 5) are pivotally mounted on opposite ends of the cross member 18. The lower end of each spindle 20 carries a horizontally extended stub shaft 22 on which a front ground wheel 24 is rotatably supported. A steering arm 26 extends forwardly from the base of each spindle 20 at a right angle to the associated stub shaft 22. The above described wagon is of conventional construction. A complete conventional wagon would also include an elongated tongue pivotally connected to the front cross member 18 with freedom of lateral pivotal movement and a pair of tie rods connecting the tongue to the steering arms 26 for steering the ground wheels 24 in response to lateral pivotal movement of the tongue.

The hitch apparatus 10 of the present invention replaces the tongue and tie rods of the conventional wagon and substantially modifies the wagon's handling characteristics. The hitch apparatus 10 includes a generally V-shaped tongue 28 having a pair of vertically spaced plates 30 and 32 at the apex thereof and a pair of rearwardly diverging legs 34 and 36. The rearward ends of legs 34 and 36 are connected to an angle iron mounting bracket 38 for pivotal movement about a horizontal axis 40. The mounting bracket 38 is adapted for rigid securement to the wagon front cross member 18 by a plurality of bolts 42. Thus the forward end of tongue 28 is free to pivot up and down relative to the wagon frame 16 but is restrained against lateral or transverse pivotal movement relative to the frame 16.

Connection of the tongue 28 to the drawbar 14 of a towing vehicle is accomplished by means of a coupling horn 44, shown best in FIGS. 5, 6 and 7. The rearward end of the coupling horn 44 is inserted between the tongue plates 30 and 32 and retained therein by an upright pivot shaft 46 for lateral pivotal movement of the coupling horn 44 relative to the tongue 28.

The coupling horn 44 is adapted for slidably receiving and releasably securing the drawbar 14 of a towing vehicle within it. Referring to FIGS. 5, 6 and 7, it is seen that the coupling horn includes a top wall 48, a bottom wall 50 and opposite sidewalls 52 and 54. Whereas the rear portion of the bottom wall 50 is horizontally disposed, the forward portion thereof is inclined forwardly and downwardly and the sidewalls diverge forwardly to facilitate insertion of the drawbar 14 into the coupling horn 44. An upright post 56 is welded onto the drawbar 14 for receipt within a flared slot 58 in the top wall 48 of the coupling horn 44. The drawbar 14 is longitudinally releasably retained within the coupling horn by a hitch pin 60 insertable through aligned holes 62 and 64 in the horn 44 and drawbar 14 respectively. With the hitch pin 60 inserted, pivotal movement of the drawbar 14 relative to the coupling horn 44 is prevented by the engagement of the post 56 with the sides of the slot 58. Thus it is seen that the coupling horn is rigidly connectable with the towing vehicle and pivotally connected to the tongue 28 for lateral turning movement of the coupling horn whenever the towing vehicle is turned to alter its direction of travel. It is this lateral turning movement of the coupling horn 44 which effects a predetermined steering movement of the front wheels 24 by the following described steering mechanism.

The steering mechanism includes a base plate 66 extended forwardly from the underside of the mounting bracket 38, as shown best in FIGS. 2 and 5. An L-shaped tie rod actuator 68 is pivotally secured to the underside of the base plate 66 by a bolt 70 inserted through the actuator 68 and a selected one of longitudinally aligned holes 72 in the base plate 66. Actuator 68 includes a forwardly extended longitudinal leg 74 having a hole 76 at the forward end thereof and a transverse leg 78 directly perpendicular to the longitudinal leg 74 and provided with an elongated slot 80.

To steer the front wagon wheels 24 in unison, a pair of tie rods 82 and 84 are pivotally interconnected between the longitudinal leg 74 of the actuator 68 and the respective steering arms 26 of the front wheels 24. The tie rods 82 and 84 are of a length such that the steering arms 26 are maintained generally in parallel relation with the longitudinal leg 74.

Pivotal movement of the actuator 68 is controlled by an elongated steering rod 86, one end of which is pivotally connected at a selected axial position along the slot 80 in the transverse leg 78 of the actuator 68. Fore and aft movement of the steering rod 86 causes the actuator 68 to pivot on bolt 70 thereby steering the front wheels 24 in unison by means of the tie rods 82 and 84.

Fore and aft movement of the steering rod 86 is controlled by the pivotal turning movement of the coupling horn 44 in the following manner. A steering lever 88 is rigidly secured to the lower end of the pivot shaft 46 for pivotal movement with the shaft. The forward end of the steering rod 86 is pivotally connected to a selected one of several aligned holes 90 in the steering lever 88 for longitudinal movement of the steering rod 86 in response to pivotal movement of the pivot shaft 46. The coupling horn 44 is keyed to the pivot shaft 46 by a transverse lock pin 92 so that pivotal movement of the shaft 46 is controlled by the pivotal turning movement of the coupling horn 44.

Referring to FIG. 5, it is to be understood that the adjustment holes 90 in the steering lever 88, holes 72 in the base plate 66 and the slot 80 in the actuator 68 are all for the purpose of adjusting the degree of pivotal movement of the actuator rod in response to a predetermined pivotal turning movement of the coupling horn 44. This adjustment is intended to be permanently set at the time the hitch apparatus 10 is installed on a wagon 12 and is provided to accommodate wagons of various wheel bases. It will be understood that the front wheels of a wagon with a long wheel base must be steered to a greater extent than the front wheels of a wagon with a short wheel base in order for both to respond like a single axle trailer with a solid mounted hitch. This adjustment is accomplished by coordinating the following three adjustable connections. First, the relative fore and aft movement of the steering rod is increased as its front end is adjusted outwardly on the steering lever 88. Secondly, the degree of pivotal movement of the actuator 68 in response to fore and aft movement of the steering rod 86 is increased as the rear end of the steering rod is adjusted inwardly of the actuator slot 80 toward the mounting bolt 70. Thirdly, the degree of steering movement of the wheels 24 in response to a given pivotal movement of the actuator 68 is adjustable by the connection of the actuator 68 to a selected one of the holes 72 in the base plate 66. It will be noted that threaded couplings 93 and 94 are provided on both ends of the tie rods and steering rod for varying the lengths of the rods to accommodate the above-described adjustments.

The present invention also concerns as part of the hitch apparatus 10 a load transfer mechanism, referred to generally at 95 in FIGS. 2 and 5, for shifting some of the load off of the front wagon wheels 24 and onto the drawbar 14 of the towing vehicle. This is accomplished by urging the forward end of the tongue 28 to pivot downwardly relative to the wagon frame 16 so that the tongue tends to simultaneously load the drawbar 14 and lift the wagon front cross member 18.

Referring to FIG. 5, the load transfer mechanism 95 includes a leaf spring 96 secured by a U-bolt 98 to a depending mast tube 100 on the underside of the hitch mounting bracket 38. The ends of the leaf spring 96 are pivotally connected by linkages 102 to a pair of depending outer rock arms 104 on a rock shaft 106 which is pivotally carried between the legs 34 and 36 of the tongue 28. A pair of inner rock arms 108 on shaft 106 rotatably carry an internally threaded coupling 110 between them. Threaded into the coupling 110 is a load transfer screw 112, the forward end of which is rotatably carried within a bearing member 114 which in turn is pivotally carried between a pair of upstanding ears 116 on a rigid tongue cross member 118. A crank handle 120 on the forward end of the load transfer screw 112 is rotated to draw the coupling 110 toward the bearing 114, thereby loading the leaf spring 96 to urge the tongue 28 downwardly relative to the wagon frame.

It is apparent that the load transfer mechanism 94 may find application on hitch structures other than that described herein. Likewise, although the hitch apparatus 10 is shown in assembly relation with a farm wagon 12, it is to be understood that the hitch apparatus of the invention is suitable for other types of towed vehicles having steerable front wheels.

To install the hitch apparatus 10 of the present invention on a farm wagon, a farmer need only remove the conventional tongue and, in its place, bolt the mounting bracket 38 to the wagon front cross member 18. The only remaining connection to be made is that of the tie rods 84 to the wagon wheel steering arms 26. The connections at the ends of the steering rod 86 and the length of the tie rods 84 and steering rod 86 are then adjusted to accommodate the specific wheel base of the wagon 12. A towing vehicle is driven rearwardly toward the hitch apparatus 10 to insert its drawbar 14 into the coupling horn 44. The converging bottom and sidewalls of the coupling horn guide the drawbar into an engaged position wherein the hitch pin 60 is inserted to effect a rigid connection. Thereafter, as the towing vehicle is driven forwardly or rearwardly, its turning movements effect a pivotal turning movement of the coupling horn 44 which through steering lever 88 longitudinally moves the steering rod 86. Rod 86 pivots the L-shaped actuator 68 which acts through the tie rods 82 and 84 to steer the front wagon wheels 24 in unison.

The hitch adjustments are set so that when the towing vehicle executes a turn, the front wagon wheels are steered to such a degree that the wagon responds in the same manner that it would if the front wheels were eliminated and a solid hitch were extended forwardly from the rear axle of the wagon.

If it is desired to shift some of the load off of the front wagon wheels 24 and onto the drawbar 14 of the towing vehicle, it is only necessary to crank the load transfer screw 112 to draw the rock arms 104 and 108 forwardly, thereby loading the leaf spring 96. As the leaf spring 96 urges the rock arm rearwardly relative to the mast tube 100, a bending moment is created which urges the tongue 28 to pivot downwardly relative to the wagon frame 16.

An alternate embodiment of the hitch apparatus of the present invention is shown in FIGS. 8-14. In FIG. 8 there is shown a farm wagon 12 having a front cross member 18 which pivotally carries a pair of wheel spindles 121 on opposite ends thereof. Each wheel spindle 121 carries a horizontally extended stub shaft 122 on which a front ground wheel 24 is rotatably supported. Extended from the base of each spindle 121 at a right angle to the associated stub shaft 122 is a rearward steering arm 124 interconnected with the rearward steering arm 124 of the opposite spindle by an elongated transverse tie rod 126. One of the wheel spindles 121 also has a forward steering arm 128 which is pivotally interconnected by another tie rod 130 to the L-shaped tie rod actuator 68. Note however that in this embodiment, tie rod actuator 68 is not pivotally connected to the underside of the wagon frame 12. Rather, it is pivotally connected to the V-shaped tongue 132 adjacent the rearward end thereof. Specifically, tongue 132 has a pair of vertically spaced plates 133 at the apex thereof and a pair of rearwardly diverging legs 134 and 136, each pivotally connected to mounting bracket 38 for pivotal movement about an axis 40. A pair of cross members 138 and 140 extend transversely between legs 134 and 136 as shown. A pivot shaft 142 extends downwardly form the underside of cross member 140 approximately centrally thereof for pivotally supporting the tie rod actuator 68. Since the tie rod actuator is supported on the tongue 132 rather than the leg and frame, it is pivotally movable with the tongue. As a result, up and down pivotal movements of the tongue does not induce steering movements of the tie rod actuator 68 through the elongated steering rod 143.

Referring to FIGS. 10-14, a modified coupling horn 44 is shown as including a top wall 148, a bottom wall 150 and opposite sidewalls 152 and 154. Bottom wall 150 (FIG. 11) has a generally horizontally disposed rearward portion and forwardly and downwardly inclined forward portion which cooperates with the forwardly diverging sidewalls 152 and 154 to facilitate insertion of a drawbar 14. A generally Y-shaped flared slot 158 is cut in the top wall 148 for engaging the upright post 56 on drawbar 14 to guide the drawbar longitudinally into the coupling horn.

To pivotally connect the coupling horn 144 to the forward tongue plates 133, openings 160 and 162 are formed in top and bottom walls 148 and 150 respectively and upper and lower portions 164 and 166 of a pivot tubing 168 are secured to the top and bottom walls 148 and 150 in alignment with the openings. Pivot tubing 168 is then pivotally received within the aligned openings of the tongue plates 133. Since pivot tubing 168 is not continuous through the coupling horn 144, the tongue 14 is slidable into the coupling horn to the extent of the tongue hole 64 being axially aligned with or registered with pivot tubing 168. In this embodiment, the steering lever 170 is fixed to the lower portion 166 of pivot tubing 168 and it is to be understood that the steering lever, pivot tubing and coupling horn are rigidly connected together for pivotal movement in unison. A locking bracket 172 is secured to upper portion 164 of pivot tubing 168 so as to also be steerable with the coupling horn 144.

A cam pin 173 is insertable through pivot tubing 168 when the drawbar hole 64 is registered therewith to connect the coupling horn to the drawbar for fore and aft travel movement therewith. However, because the Y-shaped slot 158 is oversize with respect to the post 56 on drawbar 14, it is evident that the drawbar is not initially constrained against transverse pivotal movement relative to the coupling horn. For this purpose, a pair of clamp arms or locking dogs 174 are pivotally supported on opposite sides of top wall 148. Each clamp arm is mounted on a bolt 176 which extends upwardly through a respective hole 178 in top wall 148, a washer 180, clamp arm 174, an eccentric bushing 182 and nut 184.

The clamp arms 174 are uniformly spaced on opposite sides of the longitudinal center line of the coupling horn 144 and each is somewhat elbow shaped including an inwardly extended forward end 186 and a rearward end 188. It can be seen in FIG. 12 that as the drawbar is first inserted into the coupling horn, the clamp arms 174 are positioned with the forward ends 186 spread wide so as not to interfere with drawbar post 56. Once the drawbar is fully inserted and cam pin 173 is slipped into pivot tubing 168, it is seen in FIG. 13 that cam 190 is interposed between the rearward ends 188 of the clamp arms 174. Cam 190 carries a pair of upstanding ears 192 between which a T-bar crank 194 is pivotally connected by a bolt 197. Accordingly, the top cross bar of crank 194 can be rotated to pivot cam 190 from the longitudinally disposed position of FIG. 13 to the transversely disposed position of FIG. 14 wherein the rearward ends 188 of clamp arms 174 are secured in spread-apart relation with the forward ends 186 firmly clamped against opposite sides 196 of the drawbar post 56. At this stage, the drawbar and coupling horn are forced into longitudinal alignment to compensate for any slight misalignment of the drawbar as the tractor approached the hitch apparatus.

Finally, the T-bar crank 194 may be pivoted rearwardly and downwardly to the extent that its shank is positioned between a pair of upstanding ears 198 on the locking bracket 172. Upon the insertion of a hairpin 200 through the ears and across the top of the T-bar shank, the cam pin 172 is axially secured within the pivot tubing 168 and the cam 190 is fixed in its transverse disposition for maintaining the clamp arms 174 firmly clamped against the drawbar post 56. Detachment of the hitch apparatus from the drawbar 14 is the reverse of the above procedure and it will be understood that once the cam 190 is rotated to permit the clamp arms 174 to release the drawbar post 56, the drawbar can be easily withdrawn with no interference of tight fitting parts.

Whereas the preferred embodiments of the invention have been shown and described herein, it is to be understood that many modifications, changes and alterations can be made therein without departing from the broad scope of the appending claims. For example, coupling horn 144 could be simply constructed as a plate with the drawbar adapted to lie on the upper surface thereof. Similarly, the clamp arms could be constructed to clamp against the sides of the drawbar itself to eliminate the requirement for the special horn 56.

Thus, it can be seen that the above-described hitch apparatus accomplishes at least all of its stated objects.

I claim:

1. A hitch apparatus for a vehicle having a frame and a pair of spaced-apart wheel means supported on the frame for pivotal steering movement, said hitch apparatus adapted for hitching said vehicle to a towing vehicle having a rearwardly extended drawbar, said hitch apparatus comprising, an elongated tongue having forward and rearward ends, means for connecting the rearward end of the tongue to the frame for pivotal movement about a generally horizontal axis, a coupling pivotally connected to the forward end of the tongue for turning movement about an upright pivot axis, means for detachably and rigidly connecting said coupling to the drawbar of said towing vehicle thereby to hitch said vehicle to said towing vehicle, an elongated steering rod, means for pivotally connecting one end of said steering rod to said coupling, and means for pivotally connecting the other end of said steering rod to said wheel means for pivotal steering movement of said wheel means in response to pivotal turning movement of said coupling.

2. The hitch apparatus according to claim 1 wherein said means for pivotally connecting one end of the steering rod to said coupling includes steering lever means associated with said coupling for fore and aft pivotal movement in response to pivotal turning movement of said coupling, said one end of the steering rod being pivotally connected to said steering lever means.

3. The hitch apparatus according to claim 2 wherein said means for pivotally connecting the other end of the steering rod to said wheel means includes:

a tie rod actuator, means for supporting said tie rod actuator adjacent said rearward end of the tongue for pivotal movement about an upright axis, and tie rod means pivotally connected between said tie rod actuator and said wheel means for pivotal steering movement of said wheel means in unison in response to pivotal movement of the tie rod actuator, said other end of the steering rod being pivotally connected to said tie rod actuator for pivotally moving said actuator in response to pivotal turning movement of said coupling.

4. The hitch apparatus according to claim 3 further comprising, adjustment means on said steering lever means for adjusting the extend of fore and aft movement of said steering rod relative to pivotal turning movement of said coupling.

5. The hitch apparatus of claim 2 wherein said coupling comprises a forwardly opening horn adapted to slidably receive a drawbar of a towing vehicle.

6. In a vehicle having a frame and a pair of spaced-apart wheel means supported on the frame for pivotal steering movement, an apparatus for hitching the vehicle to a towing vehicle having a rearwardly extended drawbar with a hole adjacent the rearward end thereof, said apparatus comprising, an elongated tongue having forward and rearward ends, means for connecting the rearward end of the tongue to the frame for pivotal movement about a generally horizontal axis, a coupling pivotally connected to the forward end of the tongue for turning movement about an upright pivot axis, an elongated steering rod, means for pivotally connecting one end of said steering rod to said coupling, and means for pivotally connecting the other end of said steering rod to said wheel means for pivotal steering movement of said wheel means in response to pivotal turning movement of said coupling, said coupling having an opening therethrough which is adapted for registration with said drawbar hole, pin means adapted to be positioned in said registered opening and drawbar hole to connect said coupling to said drawbar for fore and aft travel movement therewith, and clamp means supported on said coupling and operable to engage opposite sides of the drawbar in clamping relation when said coupling is connected to the drawbar by said pin means, thereby to secure said coupling to said drawbar for pivotal steering movement in unison.

7. The hitch apparatus of claim 6 wherein said clamp means comprises a pair of clamp arms pivotally connected to said coupling, each clamp arm having opposite ends, each clamp arm having one end pivotally movable into clamping engagement against a respective opposite side of the drawbar in response to the other ends being spread apart, and means for securing said other ends in spread-apart relation.

8. The hitch apparatus of claim 7 further comprising means for adjusting one of said clamp arms transversely of said coupling to compensate for wear of the clamp arms and drawbar.

9. The hitch apparatus of claim 8 wherein said adjusting means comprises an eccentric bushing in the pivotal connection of said one clamp arm to said coupling.

10. The hitch apparatus of claim 7 wherein said means for securing said other ends in spread-apart relation comprises a cam positioned for pivotal movement between said other ends of the clamp arms.

11. The hitch apparatus of claim 10 wherein said cam is secured to said pin means for pivotal movement therewith.

12. The hitch apparatus of claim 11 further comprising a crank connected to said cam for pivotal movement about an axis directed perpendicular to the pivot axis of said cam, and lock means for securing said crank to said coupling when said cam is pivotally positioned for securing said other ends of said clamp arms in spread-apart relation.

13. The hitch apparatus of claim 6 wherein said opening in said coupling is positioned generally coaxially with the pivotal connection of said coupling to the forward end of the tongue.

14. A hitch apparatus for a vehicle having a frame and a pair of spaced-apart wheel means supported on the frame for pivotal steering movement, said hitch apparatus comprising:

an elongated tongue having forward and rearward ends, means for connecting the rearward end of the tongue to the frame for pivotal movement about a generally horizontal axis, a coupling pivotally connected to the forward end of the tongue for turning movement about an upright pivot axis, means for rigidly connecting said coupling to a towing vehicle, an elongated steering rod, means for pivotally connecting one end of said steering rod to said coupling, and means for pivotally connecting the other end of said steering rod to said wheel means for pivotal steering movement of said wheel means in response to pivotal turning movement of said coupling, said means for pivotally connecting one end of the steering rod to said coupling including steering lever means associated with said coupling for fore and aft pivotal movement in response to pivotal turning movement of said coupling, said one end of the steering rod being pivotally connected to said steering lever means, said means for pivotally connecting the other end of the steering rod to said wheel means including:

a tie rod actuator, means for supporting said tie rod actuator adjacent said rearward end of the tongue for pivotal movement about an upright axis, and tie rod means pivotally connected between said tie rod actuator and said wheel means for pivotal steering movement of said wheel means in unison in response to pivotal movement of the tie rod actuator, said other end of the steering rod being pivotally connected to said tie rod actuator for pivotally moving said actuator in response to pivotal turning movement of said coupling, and adjustment means on said tie rod actuator for adjusting the degree of pivotal movement of said tie rod actuator relative to fore and aft movement of said steering rod, thereby to accommodate vehicles of different wheel bases.

15. The hitch apparatus according to claim 14 further comprising adjustment means on said steering lever means for adjusting the extent of fore and aft movement of said steering rod relative to pivotal turning movement of said coupling.

16. A hitch apparatus for a vehicle having a frame and a pair of spaced-apart wheel means supported on the frame for pivotal steering movement, said hitch apparatus comprising:
- an elongate tongue having forward and rearward ends,
- means for connecting the rearward end of the tongue to the frame for pivot movement about a generally horizontal axis,
- a coupling pivotally connected to the forward end of the tongue for turning movement about an upright pivot axis,
- means for rigidly connecting said coupling to a towing vehicle,
- an elongated steering rod,
- means for pivotally connecting one end of said steering rod to said coupling, and
- means for pivotally connecting the other end of said steering rod to said wheel means for pivotal steering movement of said wheel means in response to pivotal turning movement of said coupling,
- said means for pivotally connecting one end of the steering rod to said coupling including steering lever means associated with said coupling for fore and aft pivotal movement in response to pivotal turning movement of said coupling,
- said one end of the steering rod being pivotally connected to said steering lever means,
- said means for pivotally connecting the other end of the steering rod to said wheel means including:
- a tie rod actuator,
- means for supporting said tie rod actuator adjacent said rearward end of the tongue for pivotal movement about an upright axis, and
- tie rod means pivotally connected between said tie rod actuator and said wheel means for pivotal steering movement of said wheel means in unison in response to pivotal movement of the tie rod actuator,
- said other end of the steering rod being pivotally connected to said tie rod actuator for pivotally moving said actuator in response to pivotal turning movement of said coupling, and said tie rod actuator being supported on said tongue so as to be pivotally movable with said tongue about said horizontal axis.

17. A hitch apparatus for a vehicle having a frame and a pair of spaced-apart wheel means supported on the frame for pivotal steering movement, said hitch apparatus comprising:
- an elongated tongue having forward and rearward ends,
- means for connecting the rearward end of the tongue to the frame for pivot movement about a generally horizontal axis,
- a coupling pivotally connected to the forward end of the tongue for turning movement about an upright pivot axis,
- means for rigidly connecting said coupling to a towing vehicle, an elongated steering rod,
- means for pivotally connecting one end of said steering rod to said coupling, and
- means for pivotally connecting the other end of said steering rod to said wheel means for pivotal steering movement of said wheel means in response to pivotal turning movement of said coupling,
- said means for pivotally connecting one end of the steering rod to said coupling including steering lever means associated with said coupling for fore and aft pivotal movement in response to pivotal turning movement of said coupling,
- said one end of the steering rod being pivotally connected to said steering lever means,
- said coupling comprising a forwardly opening horn adapted to slidably receive a drawbar of a towing vehicle,
- said horn including a rearward portion pivotally connected to said tongue and an open forward portion for slidably receiving the drawbar of a towing vehicle,
- said forward portion including a downwardly and forwardly inclined bottom wall and forwardly diverging sidewalls for guiding the drawbar into an engaged position within the coupling,
- means for preventing pivotal movement of the drawbar relative to the coupling when the drawbar is in its engaged position, and
- means for releasably securing the drawbar against movement longitudinally of the coupling when the drawbar is in its engaged position.

* * * * *